United States Patent
Berger et al.

(10) Patent No.: US 10,294,392 B2
(45) Date of Patent: May 21, 2019

(54) PROCESS FOR PREPARING WATER-EMULSIFIABLE POLYURETHANE ACRYLATES

(71) Applicant: BASF SE, Ludwigshafen (DE)

(72) Inventors: Sebastian Berger, Ann Arbor, MI (US); Peter Thuery, Ludwigshafen (DE); Susanne Neumann, Speyer (DE); Uwe Burkhardt, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 318 days.

(21) Appl. No.: 15/029,817

(22) PCT Filed: Oct. 13, 2014

(86) PCT No.: PCT/EP2014/071909
§ 371 (c)(1),
(2) Date: Apr. 15, 2016

(87) PCT Pub. No.: WO2015/055591
PCT Pub. Date: Apr. 23, 2015

(65) Prior Publication Data
US 2016/0251543 A1 Sep. 1, 2016

(30) Foreign Application Priority Data
Oct. 16, 2013 (EP) .................................... 13188798

(51) Int. Cl.
| | | |
|---|---|---|
| *C09D 175/16* | (2006.01) |
| *B05D 1/28* | (2006.01) |
| *B05D 1/30* | (2006.01) |
| *B05D 1/02* | (2006.01) |
| *C08G 18/48* | (2006.01) |
| *C08G 18/66* | (2006.01) |
| *C08G 18/67* | (2006.01) |
| *C08G 18/75* | (2006.01) |
| *C08G 18/08* | (2006.01) |
| *C08G 18/12* | (2006.01) |
| *C08G 18/28* | (2006.01) |
| *C08G 18/34* | (2006.01) |
| *C09J 175/16* | (2006.01) |

(52) U.S. Cl.
CPC .............. *C09D 175/16* (2013.01); *B05D 1/02* (2013.01); *B05D 1/28* (2013.01); *B05D 1/30* (2013.01); *C08G 18/0823* (2013.01); *C08G 18/12* (2013.01); *C08G 18/283* (2013.01); *C08G 18/2865* (2013.01); *C08G 18/348* (2013.01); *C08G 18/4833* (2013.01); *C08G 18/6692* (2013.01); *C08G 18/672* (2013.01); *C08G 18/755* (2013.01); *C09J 175/16* (2013.01)

(58) Field of Classification Search
CPC combination set(s) only.
See application file for complete search history.

(56) References Cited

U.S. PATENT DOCUMENTS

| | | | |
|---|---|---|---|
| 4,192,937 A | 3/1980 | Noll et al. | |
| 4,269,748 A | 5/1981 | Nachtkamp et al. | |
| 4,292,226 A | 9/1981 | Wenzel et al. | |
| 4,596,678 A | 6/1986 | Merger et al. | |
| 4,596,679 A | 6/1986 | Hellbach et al. | |
| 5,087,739 A | 2/1992 | Bohmholdt et al. | |
| 5,194,487 A * | 3/1993 | Jacobs ............... | C08G 18/0819 524/591 |
| 2008/0194775 A1 | 8/2008 | Blum et al. | |
| 2012/0225969 A1* | 9/2012 | Miyabayashi ...... | C08F 290/067 522/53 |
| 2016/0200858 A1* | 7/2016 | Fukuda ............... | C08G 18/807 540/531 |

FOREIGN PATENT DOCUMENTS

| | | | |
|---|---|---|---|
| DE | 27 25 589 A1 | 12/1978 | |
| DE | 27 32 131 A1 | 1/1979 | |
| DE | 28 11 148 A1 | 9/1979 | |
| DE | 29 36 039 A1 | 4/1981 | |
| DE | 196 18 720 A1 | 11/1996 | |
| DE | 198 26 712 A1 | 12/1999 | |
| DE | 199 13 353 A1 | 9/2000 | |
| DE | 199 57 900 A1 | 6/2001 | |
| DE | 100 13 186 A1 | 9/2001 | |
| DE | 100 13 187 A1 | 10/2001 | |
| DE | 10 2007 026 196 A1 | 12/2008 | |
| DE | 102007026196 A1 * | 12/2008 | ......... C08G 18/4833 |
| EP | 0 007 508 A2 | 2/1980 | |
| EP | 0 021 824 A1 | 1/1981 | |
| EP | 0 057 474 A2 | 8/1982 | |
| EP | 0 098 752 A2 | 1/1984 | |
| EP | 0 126 299 A1 | 11/1984 | |
| EP | 0 126 300 A1 | 11/1984 | |
| EP | 0 154 237 A2 | 9/1985 | |
| EP | 0 168 173 A1 | 1/1986 | |
| EP | 0 355 443 A2 | 2/1990 | |
| EP | 0 381 862 A1 | 8/1990 | |
| EP | 0 495 751 A1 | 7/1992 | |
| EP | 0 613 915 A1 | 9/1994 | |
| EP | 0 615 980 A2 | 9/1994 | |
| EP | 0 704 469 A2 | 4/1996 | |
| EP | 2 316 867 A1 | 5/2011 | |
| WO | WO 98/33761 A1 | 8/1998 | |
| WO | WO 03/035596 A2 | 5/2003 | |
| WO | WO 2004/029121 A1 | 4/2004 | |
| WO | WO 2004/076519 A1 | 9/2004 | |
| WO | WO 2004/076520 A1 | 9/2004 | |
| WO | WO 2008/148739 A1 | 12/2008 | |

OTHER PUBLICATIONS

English Machine Translation of DE102007026196 created Mar. 26, 2018. (Year: 2018).*
International Search Report dated Feb. 13, 2015 in PCT/EP2014/071909 filed Oct. 13, 2014.

* cited by examiner

*Primary Examiner* — Christopher M Rodd
(74) *Attorney, Agent, or Firm* — Oblon, McClelland, Maier & Neustadt, L.L.P.

(57) ABSTRACT

The present invention relates to storage-stable water-emulsifiable polyurethane acrylates, to a process for preparation thereof and to the use thereof.

20 Claims, No Drawings

PROCESS FOR PREPARING WATER-EMULSIFIABLE POLYURETHANE ACRYLATES

The present invention relates to the use of storage-stable water-emulsifiable polyurethane acrylates and to a process for preparation thereof.

The urethane(meth)acrylates preparable in accordance with the invention are those which comprise at least one polyalkylene glycol and which can therefore be dispersed or diluted in water. Processes for preparing water-soluble, -dilutable or -emulsifiable, radiation-curable urethane(meth) acrylates are known. The hydrophilicity of such urethane (meth)acrylates is based on the water solubility of the polyethylene glycol chain. This imparts water solubility to the urethane(meth)acrylate. In addition, the water solubility can be increased by incorporating monomers each having acid or base functions into the polymer, as a result of which an internal salt is formed, which results in elevated water solubility.

Water-dispersible urethane acrylates are already known, for example from EP-A 98 752 or DE-A 2 936 039. The hydrophilicity of these known systems is based on the presence of ionic sites, especially of carboxylate or sulfonate groups, which have alkali metal cations or ammonium ions as counterions.

A disadvantage in the use of water-dispersible urethane acrylates is that the aqueous dispersions separate in the course of storage, especially when diluted or mixed with other dispersions.

There is thus a need for urethane(meth)acrylates having elevated storage stability.

The inventive water-soluble urethane(meth)acrylates are polyurethanes having (meth)acryloyl groups, alkylene oxide units incorporated within polyether chains, and preferably internal salt groups, these polyurethanes being prepared by a specific process. Hydrophilic polyurethanes of this kind are known, for example, from Polymer Science USSR, volume 15, no. 4, May 1974, pages 814-822, EP-A-0 168 173, EP-A-0 154 237, EP-A-0 021 824 or EP-A-0 381 862, and from Journal of *Applied Polymer Science*, vol. 84, 1818-1831 (2002).

EP 613915 A1 discloses urethane(meth)acrylates comprising a polyethylene glycol as difunctional diol and alcohols containing acid groups for attainment of dispersibility as formation components.

WO 2008/148739 A discloses water-emulsifiable urethane(meth)acrylates which exhibit favorable yellowing properties.

A disadvantage of the urethane(meth)acrylates described therein is that they have a tendency to separate when they are stored over a prolonged period or, when mixed with other dispersions, lead to precipitates or sediment.

It was an object of the present invention to develop radiation-curable, water-soluble or -emulsifiable urethane (meth)acrylates for the use in coating compositions, which are stable on storage, dilution and/or mixing with other dispersions.

The object was achieved by the use of urethane(meth) acrylates (A) in coating compositions comprising, as formation components,
  (a) at least one isocyanate having at least 2 isocyanate functions,
  (b) at least one polyalkylene oxide polyether having at least 2 hydroxyl functions,
  (c) at least one hydroxy-functional (meth)acrylate having exactly one hydroxyl function and at least one (meth) acrylate function,
  (d) at least one compound having at least one isocyanate-reactive group and at least one acid function,
  (e) optionally at least one compound having at least one isocyanate-reactive group and at least one basic group for neutralization of the acid groups of component (d),
  (f1) at least one monofunctional polyalkylene oxide polyether alcohol having a number-average molecular weight Mn of at least 600 g/mol,
  (f2) optionally at least one monoalcohol (f2) having exactly one hydroxyl function and no further functional group beyond that,
  (g) optionally at least one di- or polyamine,
  (h) optionally at least one primary or secondary amine (h) for activation of the (meth)acrylate groups.

The present invention further provides a process for preparing the inventive urethane (meth)acrylates in which, of components (a) to (g), components (b), (c), (d), (f1) and, if present, (e), (f2) and/or (g) are initially charged at least in part, and isocyanate (a) is added to this mixture of initially charged components.

In a further embodiment, the urethane(meth)acrylate (A) can optionally be prepared in the presence of at least one reactive diluent (B) and/or optionally in the presence of at least one solvent.

The urethane(meth)acrylates (A) thus obtained have improved stability in aqueous dispersion over a broad dilution, temperature and pH range. At the same time, the properties of the coatings, especially the adhesion on the substrate, are essentially maintained.

Particularly advantageously, the mixtures obtainable by the process described above, particularly the mixtures obtained by the process described above, can be used as a primer, particularly as an adhesion primer for wood and wood-containing substrates.

Component (a) is at least one, preferably exactly one, isocyanate having at least 2 isocyanate functions, preferably 2 to 3 and more preferably exactly 2 isocyanate functions.

The isocyanates used may be polyisocyanates or preferably monomeric diisocyanates, which may be aromatic, aliphatic or cycloaliphatic, this being referred to in this document as (cyclo)aliphatic for short.

Aromatic isocyanates are those which comprise at least one aromatic ring system, i.e. both purely aromatic and araliphatic compounds.

Cycloaliphatic isocyanates are those which comprise at least one cycloaliphatic ring system.

Aliphatic isocyanates are those which comprise exclusively linear or branched chains, in other words acyclic compounds.

The monomeric isocyanates are preferably diisocyanates bearing exactly two isocyanate groups.

In principle, higher isocyanates having an average of more than 2 isocyanate groups are also an option. Suitable examples of these include triisocyanates such as triisocyanatononane, 2,4,6-triisocyanatotoluene, triphenylmethane triisocyanate or 2,4,4'-triisocyanatodiphenyl ether, or the mixtures of diisocyanates, triisocyanates, and higher polyisocyanates that are obtained, for example, by phosgenating corresponding aniline/formaldehyde condensates and constitute polyphenyl polyisocyanates having methylene bridges.

These monomeric isocyanates include essentially no reaction products of the isocyanate groups with themselves.

The monomeric isocyanates are preferably isocyanates having 4 to 20 carbon atoms. Examples of typical diisocyanates are aliphatic diisocyanates such as tetramethylene diisocyanate, pentamethylene 1,5-diisocyanate, hexamethylene diisocyanate (1,6-diisocyanatohexane), octamethylene diisocyanate, decamethylene diisocyanate, dodecamethylene diisocyanate, tetradecamethylene diisocyanate, derivatives of lysine diisocyanate, trimethylhexane diisocyanate or tetramethylhexane diisocyanate, cycloaliphatic diisocyanates such as 1,4-, 1,3- or 1,2-diisocyanatocyclohexane, 4,4'- or 2,4'-di(isocyanatocyclohexyl)methane, 1-isocyanato-3,3,5-trimethyl-5-(isocyanate-methyl)cyclohexane (isophorone diisocyanate), 1,3- or 1,4-bis(isocyanatomethyl)cyclohexane or 2,4-, or 2,6-diisocyanato-1-methylcyclohexane, and also 3 (or 4), 8 (or 9)-bis(isocyanatomethyl) tricyclo[5.2.1.0$^{2,6}$]decane isomer mixtures, and also aromatic diisocyanates such as tolylene 2,4- or 2,6-diisocyanate and the isomer mixtures thereof, m- or p-xylylene diisocyanate, 2,4'- or 4,4'-diisocyanatodiphenylmethane and the isomer mixtures thereof, phenylene 1,3- or 1,4-diisocyanate, 1-chlorophenylene 2,4-diisocyanate, naphthylene 1,5-diisocyanate, diphenylene 4,4'-diisocyanate, 4,4'-diisocyanato-3,3'-dimethylbiphenyl, 3-methyldiphenylmethane 4,4'-diisocyanate, tetramethylxylylene diisocyanate, 1,4-diisocyanatobenzene or diphenyl ether 4,4'-diisocyanate.

Particularly preferred (cyclo)aliphatic isocyanates are 1,6-hexamethylene diisocyanate, 1,3-bis(isocyanatomethyl)cyclohexane, isophorone diisocyanate, and 4,4'- or 2,4'-di(isocyanatocyclohexyl)methane, very particular preference being given to isophorone diisocyanate and 1,6-hexamethylene diisocyanate, and especial preference to isophorone diisocyanate.

Preferred aromatic isocyanates are 2,4- or 2,6-tolylene diisocyanate and isomer mixtures thereof, and also 2,4'- or 4,4'-diisocyanatodiphenylmethane and isomer mixtures thereof, particular preference being given to 2,4- or 2,6-tolylene diisocyanate and isomer mixtures thereof in a ratio of about 80:20. It is also conceivable to use pure 2,4-tolylene diisocyanate.

It is also possible for mixtures of the isocyanates mentioned to be present.

Isophorone diisocyanate is usually in the form of a mixture, specifically a mixture of the cis and trans isomers, generally in a proportion of about 60:40 to 80:20 (w/w), preferably in a proportion of about 70:30 to 75:25, and more preferably in a proportion of approximately 75:25.

Dicyclohexylmethane 4,4'-diisocyanate may likewise be in the form of a mixture of the different cis and trans isomers.

For the present invention it is possible to use not only those diisocyanates which are obtained by phosgenating the corresponding amines but also those which are prepared without the use of phosgene, i.e. by phosgene-free processes. According to EP-A-0 126 299 (U.S. Pat. No. 4,596,678), EP-A-126 300 (U.S. Pat. No. 4,596,679), and EP-A-355 443 (U.S. Pat. No. 5,087,739), for example, (cyclo)aliphatic diisocyanates such as hexamethylene 1,6-diisocyanate (HDI), isomeric aliphatic diisocyanates having 6 carbon atoms in the alkylene radical, 4,4'- or 2,4'-di(isocyanatocyclohexyl)methane, and 1-isocyanato-3-isocyanatomethyl-3,5,5-trimethylcyclohexane(isophorone diisocyanate or IPDI), for example, can be prepared by reacting the (cyclo)aliphatic diamines with, for example, urea and alcohols to give (cyclo)aliphatic biscarbamic esters and subjecting said esters to thermal cleavage to the corresponding diisocyanates and alcohols. The synthesis is usually effected continuously in a circulation process and optionally in the presence of N-unsubstituted carbamic esters, dialkyl carbonates, and other by-products recycled from the reaction process. Diisocyanates obtained in this way generally contain a very low or even unmeasurable fraction of chlorinated compounds, which is advantageous, for example, in applications in the electronics industry.

In one embodiment of the present invention, the isocyanates used have a total hydrolyzable chlorine content of less than 200 ppm, preferably of less than 120 ppm, more preferably less than 80 ppm, even more preferably less than 50 ppm, in particular less than 15 ppm, and especially less than 10 ppm. This can be measured, for example, by ASTM method D4663-98. However, it is of course also possible to use monomeric isocyanates having a higher chlorine content, for example up to 500 ppm.

It is of course also possible to use mixtures of those monomeric isocyanates which have been obtained by reaction of the (cyclo)aliphatic diamines with, for example, urea and alcohols and cleavage of the (cyclo)aliphatic biscarbamic esters obtained with those diisocyanates which have been obtained by phosgenation of the corresponding amines.

Also conceivable, albeit less preferred, is the use of polyisocyanates in addition to or in place of the monomeric isocyanates.

The polyisocyanates, which can be formed by oligomerizing the monomeric isocyanates, are generally characterized as follows:

The mean NCO functionality of such compounds is generally at least 1.8 and may be up to 8, preferably 2 to 5, and more preferably 2.4 to 4.

The content of isocyanate groups after oligomerization, calculated as NCO=42 g/mol, is generally 5% to 25% by weight.

Preferably, the polyisocyanates are the following compounds:

1) Polyisocyanates which have isocyanurate groups and derive from aromatic, aliphatic and/or cycloaliphatic diisocyanates. Particular preference here is given to the corresponding aliphatic and/or cycloaliphatic isocyanato-isocyanurates and in particular to those based on hexamethylene diisocyanate and isophorone diisocyanate. These present isocyanurates are, in particular, trisisocyanatoalkyl and/or trisisocyanatocycloalkyl isocyanurates, which are cyclic trimers of the diisocyanates, or are mixtures with their higher homologs containing more than one isocyanurate ring. The isocyanatoisocyanurates generally have an NCO content of 10 to 30% by weight, in particular 15 to 25% by weight, and an average NCO functionality of 2.6 to 8.

2) Polyisocyanates having uretdione groups, with aromatically, aliphatically and/or cycloaliphatically bonded isocyanate groups, preferably aliphatically and/or cycloaliphatically bonded, and in particular those derived from hexamethylene diisocyanate or isophorone diisocyanate. Uretdione diisocyanates are cyclic dimerization products of diisocyanates.

The polyisocyanates having uretdione groups are obtained in the context of this invention in a mixture with other polyisocyanates, especially those mentioned under 1). To this end, the diisocyanates are converted under reaction conditions under which both uretdione groups and the other polyisocyanates are formed, or the uretdione groups are formed first and these are subsequently converted to the other polyisocyanates, or the diisocyanates are first converted to the other polyisocyanates and these are then converted to products containing uretdione groups.

3) Biuret group-containing polyisocyanates having aromatically, cycloaliphatically or aliphatically bonded, preferably cycloaliphatically or aliphatically bonded, isocyanate groups, especially tris(6-isocyanatohexyl) biuret or mixtures thereof with higher homologs thereof. These polyisocyanates having biuret groups generally have an NCO content of 18% to 22% by weight and an average NCO functionality of 2.8 to 6.
4) Urethane and/or allophanate group-containing polyisocyanates having aromatically, aliphatically or cycloaliphatically bonded, preferably aliphatically or cycloaliphatically bonded, isocyanate groups, as, for example, by reaction of excess amounts of diisocyanate, for example hexamethylene diisocyanate or isophorone diisocyanate, with mono- or polyhydric alcohols. These polyisocyanates having urethane and/or allophanate groups generally have an NCO content of 12 to 24% by weight and an average NCO functionality of 2.5 to 4.5. Such urethane and/or allophanate group-containing polyisocyanates may be prepared without catalysis or preferably in the presence of catalysts, for example ammonium carboxylates or hydroxides, or allophanatization catalysts, for example Zn(II)compounds, in each case in the presence of monohydric, dihydric or polyhydric, preferably monohydric, alcohols.
5) Polyisocyanates comprising oxadiazinetrione groups, derived preferably from hexamethylene diisocyanate or isophorone diisocyanate. Such polyisocyanates comprising oxadiazinetrione groups are obtainable from diisocyanate and carbon dioxide.
6) Polyisocyanates comprising iminooxadiazinedione groups, derived preferably from hexamethylene diisocyanate or isophorone diisocyanate. Such polyisocyanates comprising iminooxadiazinedione groups are preparable from diisocyanates by means of specific catalysts.
7) Uretonimine-modified polyisocyanates.
8) Carbodiimide-modified polyisocyanates.
9) Hyperbranched polyisocyanates, of the kind known for example from DE-A1 10013186 or DE-A1 10013187.
10) Polyurethane-polyisocyanate prepolymers, from di- and/or polyisocyanates with alcohols.
11) Polyurea-polyisocyanate prepolymers.
12) The polyisocyanates 1)-11), preferably 1), 3), 4) and 6), after preparation thereof, can be converted to biuret group-containing or urethane/allophanate group-containing polyisocyanates having aromatically, cycloaliphatically or aliphatically bonded, preferably (cyclo) aliphatically bonded, isocyanate groups. Biuret groups are formed, for example, by addition of water or reaction with amines. Urethane and/or allophanate groups are formed by reaction with monohydric, dihydric or polyhydric, preferably monohydric, alcohols, optionally in the presence of suitable catalysts. These biuret or urethane/allophanate group-containing polyisocyanates generally have an NCO content of 18% to 22% by weight and an average NCO functionality of 2.8 to 6.
13) Hydrophilically modified polyisocyanates, i.e. polyisocyanates which, as well as the groups described under 1-12, comprise those which arise in a formal sense through addition of molecules having NCO-reactive groups and hydrophilizing groups onto the isocyanate groups of the above molecules. The latter are nonionic groups such as alkyl polyethylene oxide and/or ionic groups derived from phosphoric acid, phosphonic acid, sulfuric acid or sulfonic acid, or salts thereof.
14) Modified polyisocyanates for dual-cure applications, i.e. polyisocyanates which, as well as the groups described under 1-12, comprise those which arise in a formal sense through addition of molecules having NCO-reactive groups and groups crosslinkable by UV or actinic radiation onto the isocyanate groups of the above molecules. These molecules are, for example, hydroxyalkyl(meth)acrylates and other hydroxyl-vinyl compounds.

The diisocyanates or polyisocyanates listed above may also be at least partly in blocked form.

Classes of compound used for blocking are described in D. A. Wicks, Z. W. Wicks, Progress in Organic Coatings, 36, 148-172 (1999), 41, 1-83 (2001) and 43, 131-140 (2001).

Examples of classes of compound used for blocking are phenols, imidazoles, triazoles, pyrazoles, oximes, N-hydroxy imides, hydroxybenzoic esters, secondary amines, lactams, CH-acidic cyclic ketones, malonic esters or alkyl acetoacetates.

In a preferred embodiment of the present invention, the polyisocyanate is selected from the group consisting of isocyanurates, biurets, urethanes and allophanates, preferably from the group consisting of isocyanurates, urethanes and allophanates, more preferably from the group consisting of isocyanurates and allophanates, and it is especially a polyisocyanate containing isocyanurate groups.

In one embodiment which should be mentioned, the polyisocyanate comprises polyisocyanates which comprise isocyanurate groups and derive from 1,6-hexamethylene diisocyanate.

In a further embodiment, the polyisocyanate is a mixture of polyisocyanates which comprise isocyanurate groups and derive from 1,6-hexamethylene diisocyanate and from isophorone diisocyanate.

In a particularly preferred embodiment, the polyisocyanate is a mixture comprising low-viscosity polyisocyanates, preferably polyisocyanates comprising isocyanurate groups, having a viscosity of 600-1500 mPa*s, especially below 1200 mPa*s, low-viscosity urethanes and/or allophanates having a viscosity of 200-1600 mPa*s, especially 600-1500 mPa*s, and/or polyisocyanates comprising iminooxadiazinedione groups.

Component (b) is at least one, preferably exactly one, polyalkylene oxide polyether having at least 2 hydroxyl functions, preferably 2 to 4 hydroxyl functions, more preferably 2 to 3 hydroxyl functions and most preferably exactly 2 hydroxyl functions.

For example, component (b) may comprise alkoxylated di- or polyols of the formula (Ia) to (Id)

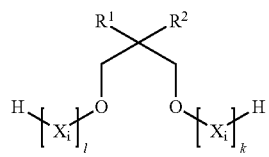
(Ia)

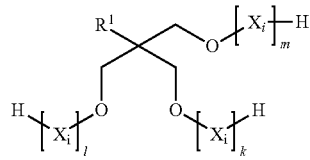
(Ib)

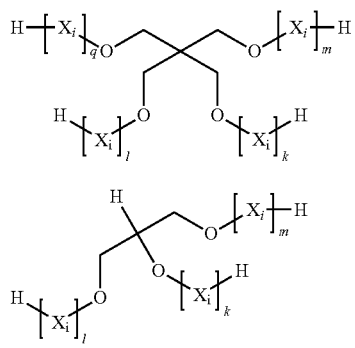

in which

R[1] and R[2] are each independently hydrogen, or $C_1$-$C_{18}$-alkyl optionally substituted by aryl, alkyl, aryloxy, alkyloxy, heteroatoms and/or heterocycles, k, l, m, q are each independently an integer from 1 to 15, preferably 1 to 10 and more preferably 1 to 7, and each $X_i$ for i=1 to k, 1 to l, 1 to m and 1 to q may independently be selected from the group of —CH$_2$—CH$_2$—O—, —CH$_2$—CH(CH$_3$)—O—, —CH(CH$_3$)—CH$_2$—O—, —CH$_2$—C(CH$_3$)$_2$—O—, —C(CH$_3$)$_2$—CH$_2$—O—, —CH$_2$—CHVin-O—, —CHVin-CH$_2$—O—, —CH$_2$—CHPh-O— and —CHPh-CH$_2$—O—, preferably from the group of —CH$_2$—CH$_2$—O—, —CH$_2$—CH(CH$_3$)—O— and —CH(CH$_3$)—CH$_2$—O—, and more preferably —CH$_2$—CH$_2$—O—, in which Ph is phenyl and Vin is vinyl.

In these formulae, $C_1$-$C_{18}$-alkyl optionally substituted by aryl, alkyl, aryloxy, alkyloxy, heteroatoms and/or heterocycles, is, for example, methyl, ethyl, propyl, isopropyl, n-butyl, sec-butyl, tert-butyl, pentyl, hexyl, heptyl, octyl, 2-ethylhexyl, 2,4,4-trimethylpentyl, decyl, dodecyl, tetradecyl, heptadecyl, octadecyl, 1,1-dimethylpropyl, 1,1-dimethylbutyl, 1,1,3,3-tetramethylbutyl, preferably methyl, ethyl or n-propyl, most preferably methyl or ethyl.

Preferred components (b) are, however, polyalkylene ethers having exactly 2 hydroxyl functions, formed essentially, preferably exclusively, in a formal sense from ethylene oxide and/or propylene oxide. Compounds of this kind are frequently referred to as polyethylene/polypropylene glycols, or generally as polyalkylene glycols.

The structure of such polyalkylene glycols is generally as follows:

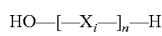

in which $X_i$ for each i=1 to n may independently be selected from the group consisting of —CH$_2$—CH$_2$—O—, —CH$_2$—CH(CH$_3$)—O— and —CH(CH$_3$)—CH$_2$—O— and more preferably —CH$_2$—CH$_2$—O—, and n may be an integer from 5 to 60, preferably 7 to 50 and more preferably 10 to 45.

The number-average molecular weight $M_n$ is preferably between 500 and 2000 g/mol. The OH numbers (to DIN 53240, potentiometric method) are preferably within a range from about 20 to 300 mg KOH/g of polymer.

The reaction of the alcohols or water with an alkylene oxide is known per se to those skilled in the art. Possible ways of conducting the reaction can be found in Houben-Weyl, Methoden der Organischen Chemie [Methods of Organic Chemistry], 4th edition, 1979, Thieme Verlag Stuttgart, ed.: Heinz Kropf, volume 6/1a, part 1, pages 373 to 385.

The preparation is preferably conducted as follows:

The polyhydric alcohol or water is initially charged, optionally dissolved in a suitable solvent, for example benzene, toluene, xylene, tetrahydrofuran, hexane, pentane or petroleum ether, at temperatures between 0° C. and 120° C., preferably between 10 and 100° C. and more preferably between 20 and 80° C., preferably under protective gas, for example nitrogen. Into this initial charge is metered, continuously or in portions, the alkylene oxide, optionally at a temperature of −30° C. to 50° C., dissolved in one of the abovementioned solvents, with good mixing, in such a way that the temperature of the reaction mixture is kept between 120 and 180° C., preferably between 120 and 150° C. This reaction can take place under a pressure of up to 60 bar, preferably up to 30 bar and more preferably up to 10 bar.

The amount of alkylene oxide is adjusted such that, per mole of polyhydric alcohol, up to (1.1×(k+l+m+q)) mol of alkylene oxide, preferably up to (1.05×(k+l+m+q)) mol of alkylene oxide and more preferably (k+l+m+q) mol of alkylene oxide is metered in, where k, l, m and q are each as defined above.

Optionally, it is possible to add up to 50 mol % based on the polyhydric alcohol, more preferably up to 25 mol % and most preferably up to 10 mol %, of a catalyst for acceleration, for example water (if it is not present in any case as a feedstock in the reaction mixture), monoethanolamine, diethanolamine, triethanolamine, dimethylaminoethanolamine, ethylene glycol or diethylene glycol, and also alkali metal hydroxides, alkoxides or hydrotalcite, preferably alkali metal hydroxides in water.

On completion of metered addition of the alkylene oxide, reaction is generally allowed to continue for 10 to 500 min, preferably 20 to 300 min, more preferably 30 to 180 min, at temperatures between 30 and 220° C., preferably 80 to 200° C. and more preferably 100 to 180° C., in the course of which the temperature may stay the same or be raised stepwise or continuously.

The conversion of alkylene oxide is preferably at least 90%, more preferably at least 95% and most preferably at least 98%. Any residues of alkylene oxide can be stripped out by passing a gas, for example nitrogen, helium, argon or steam, through the reaction mixture.

The reaction can be performed, for example, batchwise, semi-continuously or continuously in a stirred reactor, or else continuously in a tubular reactor with static mixers.

Preferably, the reaction is conducted entirely in the liquid phase.

The reaction product formed can be processed further in crude or worked-up form.

If further use in pure form is desired, the product can be purified, for example, by means of crystallization and solid/liquid separation.

The yields are generally more than 75%, usually more than 80% and frequently more than 90%.

If the reaction is conducted with a basic catalyst, for example alkali metal hydroxides, preferably sodium hydroxide or potassium hydroxide, it may be advisable to subsequently neutralize the catalyst residues still present after the reaction with acetic acid, for example. The result of this is that alkali metal acetate is still present in the polyalkylene glycol, and this can be catalytically active in subsequent conversions. It is also possible to remove the alkali metal acetate present, for example by treatment with an ion exchanger.

Component (c) is at least one, preferably 1 to 2, more preferably exactly one, hydroxy-functional (meth) acrylate(s) having exactly one hydroxyl function and at least one, preferably 1 to 3, more preferably exactly one (meth) acrylate function(s).

Components (c) may be partial esters of acrylic acid or methacrylic acid with di- or polyols preferably having 2 to 20 carbon atoms and at least two hydroxyl groups, such as ethylene glycol, diethylene glycol, triethylene glycol, 1,2-propylene glycol, 1,3-propylene glycol, 1,1-dimethyl-1,2-ethanediol, dipropylene glycol, triethylene glycol, tetraethylene glycol, pentaethylene glycol, tripropylene glycol, 1,2-, 1,3- or 1,4-butanediol, 1,5-pentanediol, neopentyl glycol, 1,6-hexanediol, 2-methyl-1,5-pentanediol, 2-ethyl-1,4-butanediol, 1,4-dimethylolcyclohexane, 2,2-bis(4-hydroxycyclohexyl)propane, glycerol, trimethylolethane, trimethylolpropane, trimethylolbutane, pentaerythritol, ditrimethylolpropane, erythritol, sorbitol, polyTHF having a molar mass between 162 and 2000, poly-1,3-propanediol having a molar mass between 134 and 400 or polyethylene glycol having a molar mass between 238 and 458. In addition, it is also possible to use esters or amides of (meth)acrylic acid with amino alcohols, examples being 2-aminoethanol, 2-(methylamino)ethanol, 3-amino-1-propanol, 1-amino-2-propanol or 2-(2-aminoethoxy)ethanol, 2-mercaptoethanol or polyaminoalkanes, such as ethylenediamine or diethylenetriamine.

Examples of amides of ethylenically unsaturated carboxylic acids with amino alcohols are hydroxyalkyl(meth)acrylamides such as N-hydroxymethylacrylamide, N-hydroxymethylmethacrylamide, N-hydroxyethylacrylamide, N-hydroxyethylmethacrylamide and 5-hydroxy-3-oxapentyl (meth)acrylamide.

Preference is given to using 2-hydroxyethyl (meth)acrylate, 2- or 3-hydroxypropyl(meth)acrylate, 1,4-butanediol mono(meth)acrylate, neopentyl glycol mono(meth)acrylate, 1,5-pentanediol mono(meth)acrylate, 1,6-hexanediol mono (meth)acrylate, glyceryl di(meth)acrylate, trimethylolpropane di(meth)acrylate, pentaerythrityl tri(meth)acrylate, 2-hydroxyethyl(meth)acrylamide, 2-hydroxypropyl(meth) acrylamide and 3-hydroxypropyl(meth)acrylamide. Particular preference is given to 2-hydroxyethyl acrylate, 2-hydroxyethyl methacrylate, 2- or 3-hydroxypropyl acrylate, 1,4-butanediol monoacrylate, 3-(acryloyloxy)-2-hydroxypropyl(meth)acrylate, and the monoacrylates of polyethylene glycol of molar mass 106 to 238.

Very particular preference is given to 2-hydroxyethyl acrylate.

Component (c) may also comprise technical grade mixtures from the acrylation of trimethylolpropane, pentaerythritol, ditrimethylolpropane or dipentaerythritol. These are usually mixtures of completely and incompletely acrylated polyols. In that case, technical mixtures from the acrylation of pentaerythritol which usually have an OH number to DIN 53240 of 99 to 115 mg KOH/g and are composed predominantly of pentaerythrityl triacrylate and pentaerythrityl tetraacrylate, and may also comprise minor amounts of pentaerythrityl diacrylate, would be preferable. This has the advantage that pentaerythrityl tetraacrylate is not incorporated into the polyurethane of the invention but instead functions simultaneously as a reactive diluent (B).

Component (d) is at least one, preferably exactly one, compound having at least one, for example 1 to 3, more preferably 2 to 3 and most preferably exactly 2 isocyanate-reactive group(s) and at least one, preferably exactly one, acid function.

Useful acid groups include carboxylic acid or sulfonic acid groups, preferably carboxylic acid groups.

Groups reactive toward isocyanate groups are selected from hydroxyl, mercapto and primary and/or secondary amino groups, preferably hydroxyl groups and primary and/or secondary amino groups.

Useful compounds (d) include especially aliphatic monomercapto-, monohydroxy- and monoamino- and iminocarboxylic acids and corresponding sulfonic acids, such as mercaptoacetic acid (thioglycolic acid), mercaptopropionic acid, mercaptosuccinic acid, hydroxyacetic acid, hydroxypropionic acid (lactic acid), hydroxysuccinic acid, hydroxypivalic acid, dimethylolpropionic acid, dimethylolbutyric acid, hydroxydecanoic acid, hydroxydodecanoic acid, 12-hydroxystearic acid, hydroxyethanesulfonic acid, hydroxypropanesulfonic acid, mercaptoethanesulfonic acid, mercaptopropanesulfonic acid, aminoethanesulfonic acid, aminopropanesulfonic acid, glycine (aminoacetic acid), N-cyclohexylaminoethanesulfonic acid, N-cyclohexylaminopropanesulfonic acid or iminodiacetic acid.

Preference is given to dimethylolpropionic acid and dimethylolbutyric acid, particular preference to dimethylolpropionic acid.

In addition, the compounds (d) may also be di- or polyamines which in turn bear a free or neutralized acid group, for example a carboxyl or sulfo group.

Particular preference is given to the ammonium or alkali metal salts of 6-amino-4-azahexanecarboxylic acid (N-(2'-carboxyethyl)ethylenediamine) and 5-amino-3-azapentanesulfonic acid (N-(2'-sulfoethyl)ethylenediamine), preferably the sodium, ammonium or potassium salts thereof, more preferably the sodium salts thereof.

The advantage of these compounds is that, analogously to the compounds (g), they lead to an increase in molar mass of the urethane(meth)acrylate and simultaneously bear a dispersion-active group.

In a preferred embodiment of the present invention, both a compound selected from the group consisting of dimethylolpropionic acid and dimethylolbutyric acid, preferably dimethylolpropionic acid, and a compound selected from the group consisting of 6-amino-4-azahexanecarboxylic acid (N-(2'-carboxyethyl)ethylenediamine) and 5-amino-3-azapentanesulfonic acid (N-(2'-sulfoethyl)ethylenediamine), preferably 6-amino-4-azahexanecarboxylic acid (N-(2'-carboxyethyl)ethylenediamine), are used.

The optional component (e) is at least one, preferably exactly one, compound having at least one, for example 1 to 3, more preferably 2 to 3 and most preferably exactly 2 isocyanate-reactive group(s) and at least one, preferably exactly one, basic group able to neutralize the acid groups of component (d).

Useful basic groups include amines, for example primary, secondary or tertiary amines, particular preference being given to tertiary amines. Preference is given to the neutralization or partial neutralization of the acid groups in (d) with amines, such as with ethanolamine or diethanolamine, or triethanolamine or 2-propanolamine or dipropanolamine, or tripropanolamine and especially with tertiary amines such as triethylamine, triethanolamine, dimethylethanolamine or diethylethanolamine. Particular preference is given to N-methyldiethanolamine and N-ethyldiethanolamine. The amounts of chemically bonded basic groups introduced and the extent of neutralization of the acid groups (which is usually 40 to 100% based on equivalents) should preferably be sufficient to ensure dispersion of the polyurethanes in an aqueous medium, which is familiar to the person skilled in the art.

Instead of or in addition to component (e), it may also be possible to use acidic groups with inorganic or organic bases lacking isocyanate-reactive groups, such as alkali metal and alkaline earth metal hydroxides, oxides, carbonates and hydrogencarbonates, and ammonia or tertiary amines for neutralization or partial neutralization. Preference is given to neutralization or partial neutralization with sodium hydroxide or potassium hydroxide or tertiary amines such as triethylamine, tri-n-butylamine or ethyldiisopropylamine. The amounts of chemically bonded acid groups introduced and the extent of neutralization of the acid groups (which is usually 40 to 100% based on equivalents) should preferably be sufficient to ensure dispersion of the polyurethanes in an aqueous medium, which is familiar to the person skilled in the art.

Component (f) comprises alcohols having exactly one hydroxyl function. These may be monofunctional polyalkylene oxide polyether alcohols having a number-average molecular weight Mn of at least 600 g/mol as obligatory component (f1), or optionally additionally monoalcohols (f2) having exactly one hydroxyl function and no further functional group beyond that.

Component (f1) comprises monofunctional polyalkylene oxide polyether alcohols, which are reaction products of suitable starter molecules with polyalkylene oxides.

The number-average molecular weight Mn of component (f1) is at least 600 g/mol, preferably at least 700, more preferably at least 800, even more preferably at least 900 and especially at least 1000 g/mol.

The upper limit in the number-average molecular weight Mn is generally up to 3000 g/mol, preferably up to 2500, more preferably up to 2000 and most preferably up to 1500 g/mol.

The function of the compounds (f1) is to stabilize the urethane(meth)acrylates (A) during storage or in the course of addition of dispersions.

Suitable starter molecules for preparation of monohydric polyalkylene oxide polyether alcohols are thiol compounds, monohydroxy compounds of the general formula $$R^3-O-H$$

or secondary monoamines of the general formula $$R^5R^6N-H$$

in which $R^4$, $R^5$ and $R^6$ are each independently $C_1$-$C_{20}$-alkyl, $C_2$-$C_{20}$-alkyl optionally interrupted by one or more oxygen and/or sulfur atoms and/or one or more substituted or unsubstituted imino groups, $C_6$-$C_{12}$-aryl, $C_5$-$C_{12}$-cycloalkyl or a five- to six-membered heterocycle having oxygen, nitrogen and/or sulfur atoms, or $R^2$ and $R^3$ together form an unsaturated, saturated or aromatic ring optionally interrupted by one or more oxygen and/or sulfur atoms and/or one or more substituted or unsubstituted imino groups, where the radicals mentioned may each be substituted by functional groups, aryl, alkyl, aryloxy, alkyloxy, halogen, heteroatoms and/or heterocycles.

Preferably, $R^3$, $R^4$ and $R^5$ are each independently $C_1$- to $C_4$-alkyl, i.e. methyl, ethyl, iso-propyl, n-propyl, n-butyl, iso-butyl, sec-butyl or tert-butyl; more preferably, $R^1$, $R^2$ and $R^3$ are each methyl.

Monofunctional starter molecules suitable by way of example are saturated monoalcohols such as methanol, ethanol, n-propanol, isopropanol, n-butanol, isobutanol, sec-butanol, the isomeric pentanols, hexanols, octanols, and nonanols, n-decanol, n-dodecanol, n-tetradecanol, n-hexadecanol, n-octadecanol, cyclohexanol, cyclopentanol, the isomeric methylcyclohexanols or hydroxymethylcyclohexane, 3-ethyl-3-hydroxymethyloxetane, or tetrahydrofurfuryl alcohol; unsaturated alcohols such as allyl alcohol, 1,1-dimethylallyl alcohol or oleyl alcohol, aromatic alcohols such as phenol, the isomeric cresols or methoxyphenols, araliphatic alcohols such as benzyl alcohol, anisyl alcohol or cinnamyl alcohol; secondary monoamines such as dimethylamine, diethylamine, dipropylamine, diisopropylamine, di-n-butylamine, diisobutylamine, bis(2-ethylhexyl)amine, N-methyl- and N-ethylcyclohexylamine or dicyclohexylamine, heterocylic secondary amines such as morpholine, pyrrolidine, piperidine or 1H-pyrazole, and also amino alcohols such as 2-dimethylaminoethanol, 2-diethylaminoethanol, 2-diisopropylaminoethanol, 2-dibutylaminoethanol, 3-(dimethylamino)-1-propanol or 1-(dimethylamino)-2-propanol.

Examples of polyethers started on amines are those in the Jeffamine® M series, which are methyl-capped polyalkylene oxides having an amino function, such as M-600 (XTJ-505) having a propylene oxide (PO)/ethylene oxide (EO) ratio of about 9:1 and a molar mass of about 600, M-1000 (XTJ-506): PO/EO ratio 3:19, molar mass about 1000; M-2005 (XTJ-507): PO/EO ratio 29:6, molar mass about 2000, or M-2070: PO/EO ratio 10:31, molar mass about 2000.

Alkylene oxides suitable for the alkoxylation reaction are ethylene oxide, propylene oxide, iso-butylene oxide, vinyloxirane and/or styrene oxide, which can be used in any order or else in a mixture in the alkoxylation reaction.

Preferred alkylene oxides are ethylene oxide, propylene oxide, and mixtures thereof, particular preference being given to ethylene oxide.

Preferred polyether alcohols are those based on polyalkylene oxide polyether alcohols prepared using saturated aliphatic or cycloaliphatic alcohols of the kind specified above as starter molecules. Very particular preference is given to those based on polyalkylene oxide polyether alcohols prepared using saturated aliphatic alcohols having 1 to 4 carbon atoms in the alkyl radical. Especially preferred polyalkylene oxide polyether alcohols are those started from methanol.

The monohydric polyalkylene oxide polyether alcohols contain an average of generally at least 12 alkylene oxide units, preferably at least 15 alkylene oxide units, per molecule, more preferably at least 18 and most preferably min 20 alkylene oxide units, especially ethylene oxide units.

The monohydric polyalkylene oxide polyether alcohols contain an average of generally up to 50 alkylene oxide units per molecule, preferably up to 45, more preferably up to 40 and most preferably up to 35 alkylene oxide units, especially ethylene oxide units.

Preferred polyether alcohols are thus compounds of the formula $$R^3-O-[-Y_i-]_w-H$$

in which $R^3$ is as defined above, w is an integer from 12 to 50, preferably 15 to 45, more preferably 18 to 40 and most preferably 20 to 35 and each $Y_i$ for i=1 to w may independently be selected from the group of $-CH_2-CH_2-O-$, $-CH_2-CH(CH_3)-O-$, $-CH(CH_3)-CH_2-O-$, $-CH_2-C(CH_3)_2-O-$, $-C(CH_3)_2-CH_2-O-$, $-CH_2-CHVin-O-$, $-CHVin-CH_2-O-$, $-CH_2-CHPh-O-$ and $-CHPh-CH_2-O-$, preferably from the group of $-CH_2-CH_2-O-$, $-CH_2-CH(CH_3)-O-$ and $-CH(CH_3)-CH_2-O-$, and more preferably $-CH_2-CH_2-O-$, in which Ph is phenyl and Vin is vinyl.

The polyalkylene oxide polyether alcohols are generally prepared by alkoxylation of the starter compounds in the presence of a catalyst, for example an alkali metal or alkaline earth metal hydroxide, oxide, carbonate or hydrogencarbonate.

The optional component (f2) is at least one monoalcohol having exactly one hydroxyl function and no further functional group beyond that. Preference is given to alkanols, particular preference to $C_1$-$C_{20}$-alkanol, very particular preference to $C_1$-$C_{12}$-alkanols and especially to $C_1$-$C_4$-alkanols.

Examples of these are methanol, ethanol, n-propanol, isopropanol and n-butanol, preference being given to methanol.

The function of the compounds (f2) is to satisfy any unconverted isocyanate groups remaining in the course of preparation of the urethane(meth)acrylates (A).

According to the components used, the viscosity of the urethane(meth)acrylate (A) may be up to 25 and preferably less than 20 Pas.

The double bond density, i.e. the content of (meth)acrylate groups, in the solvent-free urethane(meth)acrylate is preferably from 0.1 to 2, more preferably 0.2 to 1.5, even more preferably from 0.3 to 1.3 and especially 0.5 to 1.0 mol/kg.

Therefore, the urethane(meth)acrylate (A) can optionally, albeit less preferably, be prepared in the presence of at least one reactive diluent (B).

The latter is at least one radiation-curable compound which, aside from free-radically polymerizable groups, preferably acrylate or methacrylate groups, does not comprise any groups reactive toward isocyanate or hydroxyl groups and additionally has a low viscosity, preferably of less than 150 mPas (in this document, unless stated otherwise, the viscosity is reported at 25° C. to DIN EN ISO 3219/A.3 in a cone-plate system with a shear rate of 1000 s$^{-1}$).

Preferred compounds (B) have one to six (meth)acrylate groups, more preferably one to four, most preferably two to four.

Particularly preferred compounds (B) have a boiling point of more than 200° C. at standard pressure.

Reactive diluents are described in general terms in P. K. T. Oldring (editor), Chemistry & Technology of UV & EB Formulations for Coatings, Inks & Paints, Vol. II, Chapter III: Reactive Diluents for UV & EB Curable Formulations, Wiley and SITA Technology, London 1997.

Reactive diluents are, for example, esters of (meth)acrylic acid with alcohols having 1 to 20 carbon atoms, examples being methyl(meth)acrylate, ethyl(meth)acrylate, butyl (meth)acrylate, 2-ethylhexyl(meth)acrylate, dihydrodicyclopentadienyl acrylate, vinylaromatic compounds, e.g. styrene, divinylbenzene, α,β-unsaturated nitriles, e.g. acrylonitrile, methacrylonitrile, α,β-unsaturated aldehydes, e.g. acrolein, methacrolein, vinyl esters, e.g. vinyl acetate, vinyl propionate, halogenated ethylenically unsaturated compounds, e.g. vinyl chloride, vinylidene chloride, conjugated unsaturated compounds, e.g. butadiene, isoprene, chloroprene, monounsaturated compounds, e.g. ethylene, propylene, 1-butene, 2-butene, isobutene, cyclic monounsaturated compounds, e.g. cyclopentene, cyclohexene, cyclododecene, N-vinylformamide, allylacetic acid, vinylacetic acid, monoethylenically unsaturated carboxylic acids having 3 to 8 carbon atoms and water-soluble alkali metal, alkaline earth metal or ammonium salts thereof, for example: acrylic acid, methacrylic acid, dimethylacrylic acid, ethacrylic acid, maleic acid, citraconic acid, methylenemalonic acid, crotonic acid, fumaric acid, mesaconic acid, and itaconic acid, maleic acid, N-vinylpyrrolidone, N-vinyllactams such as N-vinylcaprolactam, N vinyl-N-alkylcarboxamides or N-vinylcarboxamides, such as N-vinylacetamide, N-vinyl-N-methylformamide, and N-vinyl-N-methylacetamide, or vinyl ethers, examples being methyl vinyl ether, ethyl vinyl ether, n-propyl vinyl ether, iso-propyl vinyl ether, n-butyl vinyl ether, sec-butyl vinyl ether, iso-butyl vinyl ether, tert-butyl vinyl ether, and mixtures thereof.

Examples of compounds (B) having at least two free-radically polymerizable C=C double bonds are especially the diesters and polyesters of the aforementioned α,β-ethylenically unsaturated mono- and/or dicarboxylic acids with diols or polyols. Particular preference is given to hexanediol diacrylate, hexanediol dimethacrylate, octanediol diacrylate, octanediol dimethacrylate, nonanediol diacrylate, nonanediol dimethacrylate, decanediol diacrylate, decanediol dimethacrylate, pentaerythrityl diacrylate, dipentaerythrityl tetraacrylate, dipentaerythrityl triacrylate, pentaerythrityl tetraacrylate, etc. Preference is also given to the esters of alkoxylated polyols with α,β-ethylenically unsaturated mono- and/or dicarboxylic acids, for example the polyacrylates or -methacrylates of alkoxylated trimethylolpropane, glycerol or pentaerythritol, and also of diethylene glycol, triethylene glycol, dipropylene glycol or tripropylene glycol. Additionally suitable are esters of alicyclic diols, such as cyclohexanediol di(meth)acrylate and bis(hydroxymethyl ethyl) cyclohexanedi(meth)acrylate. Further suitable reactive diluents are trimethylolpropane monoformal acrylate, glycerol formal acrylate, 4-tetrahydropyranyl acrylate, 2-tetrahydropyranyl methacrylate and tetrahydrofurfuryl acrylate.

Optionally, the preparation of the polyurethane can be conducted in at least one, preferably exactly one, solvent. Preference is given here to water-miscible solvents, particular preference to those having a lower boiling point than water. Examples of these are acetone, tetrahydrofuran, butanone, diethyl ketone, cyclic or open-chain carbonates, N-methylpyrrolidone or N-ethylpyrrolidone.

It is optionally also possible to add a primary or secondary amine (h) to the urethane(meth)acrylate (A) and/or to the reactive diluent (B) for activation of the (meth)acrylate groups.

It is preferable to dispense with the addition of a compound (h), since the presence of amines frequently causes the products to have an enhanced tendency to yellow. If the (meth)acrylate groups are activated by compounds (h), the following applies to the compounds (h):

In the compounds (h), the number of aminic hydrogen atoms (N—H) of primary and/or secondary amino groups is preferably 1 to 6, more preferably 2 to 4.

For example, the number of the aminic hydrogen atoms in a compound having two primary amino groups is 4, and in a compound having one primary and one secondary amino group is 3.

Primary or secondary amino groups in the compounds (h) add onto acryloyl groups or methacrylate groups in the manner of a Michael addition. This so-called amine modification results in an increase in the reactivity of the (meth)acrylates thus modified, and this elevated reactivity then reduces the tackiness of the coatings obtained.

As a result of Michael addition onto (meth)acrylate groups, primary amino groups become secondary amino groups, which can in turn add onto (meth)acryloyl groups to form tertiary amino groups.

Suitable compounds (h) having at least one primary and/or secondary amino group are generally of low molecular weight and preferably have a molar mass below 1000.

Examples include primary monoamines such as $C_1$-$C_{20}$-alkylamines, especially n-butylamine, n-hexylamine, 2-ethylhexylamine, octadecylamine, isopropanolamine or methoxypropylamine, cycloaliphatic amines such as cyclohexylamine, and amines containing (hetero)aromatic groups, such as benzylamine, 1-(3-aminopropyl)imidazole and tetrahydrofurfurylamine.

Compounds having 2 primary amino groups are, for example, $C_1$-$C_{20}$-alkylenediamines such as ethylenediamine, butylenediamine, neopentanediamine or hexamethylenediamine.

Compounds having secondary amino groups are, for example, dimethylamine, diethylamine, diisopropylamine or di-n-butylamine, and also piperidine, pyrrolidine and morpholine.

Further examples include 4,9-dioxadodecane-1,12-diamine, 4,7,10-trioxatridecane-1,13-diamine, 4,4'-diaminodicyclohexylmethane and isophoronediamine. Compounds having primary or secondary amino groups with at least one hydroxyl group include alkanolamines, for example mono- or diethanolamine, aminoethoxyethanol, aminoethylethanolamine, 2-aminopropan-1-ol, dipropanolamine, 2-aminobutan-1-ol, 3-aminopropan-1-ol, hydroxyethylpiperazine, piperazine, imidazole, etc.

Apart from amino functions, the compounds (h) preferably do not have any further functional groups.

Compounds having primary and secondary amino groups are, for example, 3-amino-1-methylaminopropane, diethylenetriamine, triethylenetetramine, dipropylenetriamine, N,N'-bis(3-aminopropyl)ethylenediamine.

Preferably, the compounds (h) having one or more primary and/or secondary amino groups are used in such amounts that, for every 1 mol of the (meth)acrylate groups in the compounds (A) and/or (B), 0.005 to 0.4, preferably 0.01 to 0.2 mol, more preferably 0.02 to 0.1 mol, of aminic hydrogen atoms comes from primary or secondary amino groups in the compounds (h).

The optional addition of the compound (h) generally follows completion of the preparation of the urethane(meth) acrylate, i.e. after the reaction of components (a) to (f) has essentially concluded.

The composition of the urethane(meth)acrylates is generally as follows:
(a) 100 mol % of isocyanate functions,
(b) 25 to 75 mol % of hydroxyl functions (based on isocyanate functions in (a)), preferably 40 to 60 mol %,
(c) 10 to 80 mol % of hydroxyl functions (based on isocyanate functions in (a)), preferably 20 to 50 mol %,
(d) 0 to 30 mol % of hydroxyl functions (based on isocyanate functions in (a)), preferably 0 to 20 mol %,
(e) 0 to 5 mol % of isocyanate-reactive groups (based on isocyanate functions in (a)),
(f1) 5 to 15 mol % of hydroxyl functions (based on isocyanate functions in (a)), preferably 5 to 10 mol % of hydroxyl functions,
(f2) 0 to 5 mol % of hydroxyl functions (based on isocyanate functions in (a)),
(g) 0 to 5 mol % of amino functions (based on isocyanate functions in (a)),
(h) up to 0.4, preferably 0.01 to 0.2 mol, more preferably 0.02 to 0.1 mol, of aminic hydrogen atoms of primary or secondary amino groups per 1 mol of (meth)acrylate groups in the compounds (A) and/or (B), with the proviso that the sum total of the hydroxyl functions in components (b), (c), (d), (e) and (f) adds up to 100 mol % of hydroxyl functions (based on isocyanate functions in (a)).

It may be advisable to use component (a) comprising isocyanate groups in excess, for example up to 120 mol %, preferably up to 115 mol %, more preferably up to 110 mol % and most preferably up to 105 mol %. This is especially preferred when at least one of the components used, especially the hygroscopic compound (b), comprises water, which reacts with isocyanate functions in competition with hydroxyl functions.

The reactive diluent (B) may be present in 0 to 3 times the amount of the urethane(meth)acrylate (A) during the reaction and/or be added after the preparation of the urethane (meth)acrylate (A), preferably in 0.1 to 2 times the amount.

The polyurethanes are appropriately prepared by reacting the components, observing the inventive sequence of addition, in the melt or in the presence of an inert, water-miscible solvent (see above) at temperatures of 20 to 160° C., preferably 50 to 100° C., with a reaction time of typically 2 to 10 h. It is possible to accelerate the reaction through the additional use of substances which are catalytically active in a manner known per se, such as dibutyltin dilaurate, tin(II) octoate or 1,4-diazabicyclo[2.2.2]octane, normally in amounts of 10 to 500 ppm, based on the solvent-free reaction mixture. Subsequently, dilution is optionally effected with a water-miscible solvent, ionogenic groups can optionally be ionized by neutralization if this has not already been done, water can be added and di- or polyamines can optionally be stirred in for chain extension. Thereafter, any organic solvents additionally used are typically distilled off, which is why preference is given to those solvents whose boiling point is below the boiling point of water. Optionally, the di- or polyamines for chain extension can also be added prior to the dispersion with water. The amount of water added is typically such that the inventive aqueous polyurethane formulations have a solids content of 10 to 80% by weight.

According to the invention, the urethane(meth)acrylate (A) is prepared from components (a) to (f) by initially charging at least components (b) and (c) and optionally (d) at least in part, preferably in full, and adding the isocyanate (a) to this mixture of the initially charged components.

For this purpose, preferably at least half of the planned use amount of component (b) is initially charged, preferably at least 65%, more preferably at least 75% and especially the full amount.

In addition, preferably at least half of the planned use amount of component (c) is initially charged, preferably at least 65%, more preferably at least 75% and especially the full amount.

If component (d) is used, preferably at least half of the planned use amount of component (d) is initially charged, preferably at least 65%, more preferably at least 75% and especially the full amount.

The isocyanate (a) is then added to this mixture of components (b) and (c) and optionally (d). This can be done continuously, in two or more portions, or in one addition.

The reaction mixture is then reacted at temperatures of 50 to 100° C. over a period of 4 to 10 hours, preferably of 6 to 10 hours, with stirring or pumped circulation.

During the reaction, the temperature may stay the same or be increased continuously or stepwise.

The reaction is preferably accelerated by addition of a suitable catalyst. Such catalysts are known from the literature, for example from G. Oertel (ed.), Polyurethane [Polyurethanes], 3rd edition 1993, Carl Hanser Verlag, Munich-Vienna, pages 104 to 110, chapter 3.4.1. "Katalysatoren" [Catalysts], and are preferably organic amines, especially tertiary aliphatic, cycloaliphatic or aromatic amines, Brønsted acids and/or Lewis-acidic organometallic compounds, more preferably Lewis-acidic organometallic compounds.

These are preferably Lewis-acidic organic metal compounds for which tin compounds, for example, are an option, for example tin(II)salts of organic carboxylic acids, e.g. tin(II) diacetate, tin(II)dioctoate, tin(II)bis(ethylhexanoate) and tin (II)dilaurate, and the dialkyltin(IV)salts of organic carboxylic acids, e.g. dimethyltin diacetate, dibutyltin diacetate, dibutyltin dibutyrate, dibutyltin bis(2-ethylhexanoate), dibutyltin dilaurate, dibutyltin maleate, dioctyltin dilaurate and dioctyltin diacetate. In addition, it is possible to use zinc(II) salts, for example zinc(II)dioctoate.

Other possibilities are metal complexes such as acetylacetonates of iron, titanium, aluminum, zirconium, manganese, nickel, zinc and cobalt.

Further metal catalysts are described by Blank et al. in Progress in Organic Coatings, 1999, vol. 35, pages 19-29.

Tin- and zinc-free alternatives used include compounds of zirconium, of bismuth, of titanium and of aluminum. These are, for example, zirconium tetraacetylacetonate (e.g. K-KAT® 4205 from King Industries); zirconium dionates (e.g. K-KAT® XC-9213; XC-A 209 and XC-6212 from King Industries); aluminum dionate (e.g. K-KAT® 5218 from King Industries).

Useful zinc and bismuth compounds include those in which the following anions are used: $F^-$, $Cl^-$, $ClO^-$, $ClO_3^-$, $ClO_4^-$, $Br^-$, $I^-$, $IO_3^-$, $CN^-$, $OCN^-$, $NO_2^-$, $NO_3^-$, $HCO_3^-$, $CO_3^{2-}$, $S^{2-}$, $SH^-$, $HSO_3^-$, $SO_3^{2-}$, $HSO_4^-$, $SO_4^{2-}$, $SO_2O_2^{2-}$, $S_2O_4^{2-}$, $S_2O_5^{2-}$, $S_2O_6^{2-}$, $S_2O_7^{2-}$, $S_2O_8^{2-}$, $H_2PO_2^-$, $H_2PO_4^-$, $HPO_4^{2-}$, $PO_4^{3-}$, $P_2O_7^{4-}$, $(OC_nH_{2n+1})^-$, $(C_nH_{2n-1}O_2)^-$, $(C_nH_{2n-3}O_2)^-$ and $(C_{n+1}H_{2n-2}O_4)^{2-}$, where n represents the numbers 1 to 20. Preference is given to the carboxylates in which the anion obeys the formulae $(C_nH_{2n-1}O_2)^-$ and $(C_{n+1}H_{2n-2}O_4)^{2-}$ where n is 1 to 20. Particularly preferred salts have, as anions, monocarboxylates of the general formula $(C_nH_{2n-1}O_2)^-$ where n represents the numbers 1 to 20. Particular mention should be made here of formate, acetate, propionate, hexanoate, neodecanoate and 2-ethylhexanoate.

Among the zinc catalysts, preference is given to the zinc carboxylates, particular preference to those of carboxylates having at least six carbon atoms, most preferably at least eight carbon atoms, especially zinc(II)diacetate or zinc(II) dioctoate or zinc(II)neodecanoate. Commercially available catalysts are, for example, Borchi® Kat 22 from OMG Borchers GmbH, Langenfeld, Germany.

Among the bismuth catalysts, preference is given to the bismuth carboxylates, particular preference to those of carboxylates having at least six carbon atoms, especially bismuth octoates, ethylhexanoates, neodecanoates or pivalates; for example K-KAT 348, XC-B221; XC-C227, XC 8203 and XK-601 from King Industries, TIB KAT 716, 716LA, 716XLA, 718, 720, 789 from TIB Chemicals and those from Shepherd Lausanne, and also, for example, Borchi® Kat 24; 315; 320 from OMG Borchers GmbH, Langenfeld, Germany.

Mixtures of different metals may be involved, as, for example, in Borchi® Kat 0245 from OMG Borchers GmbH, Langenfeld, Germany.

Among the titanium compounds, preference is given to the titanium tetraalkoxides $Ti(OR)_4$, particular preference to those of alcohols ROH having 1 to 8 carbon atoms, for example methanol, ethanol, iso-propanol, n-propanol, n-butanol, iso-butanol, sec-butanol, tert-butanol, n-hexanol, n-heptanol, n-octanol, preferably methanol, ethanol, iso-propanol, n-propanol, n-butanol, tert-butanol, more preferably isopropanol and n-butanol.

These catalysts are suitable for solvent-based, water-based and/or blocked systems.

Molybdenum catalysts, tungsten catalysts and vanadium catalysts are described especially for the conversion of blocked polyisocyanates in WO 2004/076519 and WO 2004/076520.

Preferred Lewis-acidic organic metal compounds are dimethyltin diacetate, dibutyltin dibutyrate, dibutyltin bis(2-ethylhexanoate), dibutyltin dilaurate, dioctyltin dilaurate, zinc(II)dioctoate, zirconium acetylacetonate, zirconium 2,2,6,6-tetramethyl-3,5-heptanedionate and bismuth 2-ethylhexanoate.

Particular preference is given, however, to dibutyltin dilaurate, bismuth neodecanoate, zinc neodecanoate and bismuth 2-ethylhexanoate, very particular preference to bismuth neodecanoate, bismuth 2-ethylhexanoate and zinc neodecanoate.

It is possible to additionally increase the activity of the catalysts through presence of acids, for example through acids having a pKa of <2.5, as described in EP 2316867 A1, or having a pKa between 2.8 and 4.5, as described in WO 04/029121 A1. Preference is given to the use of acids having a pKa of not more than 4.8, more preferably of not more than 2.5.

It is also conceivable to conduct the reaction without catalyst, but the reaction mixture in this case has to be subjected to higher temperatures and/or the reaction time has to be extended.

In order to avoid unwanted polymerization of the (meth) acrylate groups during the reaction, polymerization inhibitors can be added. Inhibitors of this kind are described, for example, in WO 03/035596, page 5 line 35 to page 10 line 4, which is hereby incorporated by reference into the present disclosure content.

Preference is given to adding one or more polymerization inhibitors to the reaction mixture, selected from the group consisting of 2,6-di-tert-butyl-4-methylphenol, hydroquinone monomethyl ether, phenothiazine, triphenyl phosphite, diphenylethene and 4-hydroxy-2,2,6,6-tetramethylpiperidine N-oxyl.

In order to crosslink the prepolymers formed during the urethanization reaction, for a further increase in molar mass, these can optionally be reacted with a di- or polyamine without any further functional group (g). To this end, the prepolymers obtained from the above reaction, when the conversion of components (a) to (d) is essentially complete, i.e. to an extent, for example, of at least 95%, preferably to an extent of at least 97% and more preferably to an extent of at least 98%, are optionally reacted with at least one, preferably exactly one, di- or polyamine (g) for conversion of the free isocyanate groups still present.

These di- or polyamines (g) do not have any further functional groups apart from amino functions.

In a preferred embodiment, component (g) is added as soon as the NCO content (calculated at 42 g/mol) of the reaction mixture is not more than 1.5% by weight, more preferably not more than 1.2% by weight, even more preferably not more than 1.0% by weight and especially not more than 0.9% by weight.

The NCO content should be at least 0.2% by weight, preferably at least 0.3% by weight, more preferably at least 0.4% by weight and most preferably at least 0.5% by weight.

Diamines are, for example, 1,2-diaminoethane, 1,6-diaminohexane, piperazine, 2,5-dimethylpiperazine, 1-amino-3-aminomethyl-3,5,5-trimethylcyclohexane (IPDA), 4,4'-di (aminocyclohexyl)methane, 1,4-diaminocyclohexane, 1,2- and 1,3-diaminopropane, hydrazine, hydrazine hydrate; triamines are, for example, diethylenetriamine, or tetramines such as N,N'-bis(3-aminopropyl)-1,4-diaminobutane. Also useful are ketimines as described in DE-B 27 25 589, ketazines such as those of DE-B 28 11 148 and U.S. Pat. No. 4,269,748, amine salts such as those in U.S. Pat. No. 4,292,226, or oxazolidines as described in DE-B 27 32 131 and U.S. Pat. No. 4,192,937. These are masked polyamines from which the corresponding polyamines are released as intermediates in the presence of water.

Such products are described, for example, in EP 704469 A2, page 3 lines 47 to 49, for which possible starting diamines as mentioned therein are 1,2-ethylenediamine, 1,3-propylenediamine, 1,4-butylenediamine, 1,5-pentylenediamine or 1,6-hexylenediamine, especially 1,2-ethylenediamine.

In general, 0-10 mol % of di- or polyamine (g) (sum total of primary and secondary amino groups, based on isocyanate groups in (a)) is used, preferably 0-8 mol %, more preferably 0-7 and most preferably 0-5 mol %. Especially preferred is 0 mol % of di- or polyamine (g), meaning that the addition of di- or polyamine (g) is dispensed with.

The reaction can be regarded as having ended when the NCO value has reached the theoretical conversion value to an extent of at least 95%, preferably to an extent of at least 97% and more preferably to an extent of at least 98%.

If unconverted isocyanate groups should still be present, the reaction can be completed under the above reaction conditions by reaction with the monoalcohol (f).

It is possible to disperse or to dilute the reaction mixture in water after the preparation.

It is an advantage of the inventive urethane(meth)acrylates that they form stable aqueous dispersions in the concentration range from 10 to 90% by weight, preferably up to a dilution to up to 20% by weight, more preferably up to 25% by weight, even more preferably up to 30% and especially up to 35% by weight.

The solids content of the inventive urethane(meth)acrylate in the dispersion is preferably up to 85% by weight, more preferably up to 80% by weight, even more preferably up to 75% and especially up to 70% by weight.

The reaction can preferably be effected in the presence of reactive diluent (B), which both functions as a solvent for the individual components and for the urethane(meth)acrylate (A) and is part of the coating composition in the later application.

For this purpose, the entire amount of reactive diluent may be initially charged as early as the start of the reaction, or it may be added over the course of the reaction. It may also be advisable to add a portion of the reactive diluent (B) only after the reaction has ended in order to further dilute the urethane(meth)acrylate (A).

Preferably 30 to 100% of all the reactive diluent (B) used are used at the early stage of the reaction, more preferably 50 to 100%, even more preferably 70 to 100% and especially 100%. The rest can be added after the reaction has ended.

The urethane(meth)acrylate (A) obtained after the inventive reaction, optionally dissolved in reactive diluent (B), can advantageously be used as or in radiation-curable coating compositions.

These coating compositions may comprise further constituents:

If the curing of the coating compositions is effected not with electron beams but by means of UV radiation, at least one photoinitiator which can initiate the polymerization of ethylenically unsaturated double bonds is preferably present.

Photoinitiators may be, for example, photoinitiators known to the skilled worker, examples being those specified in "Advances in Polymer Science", Volume 14, Springer Berlin 1974 or in K. K. Dietliker, Chemistry and Technology of UV and EB Formulation for Coatings, Inks and Paints, Volume 3; Photoinitiators for Free Radical and Cationic Polymerization, P. K. T. Oldring (Eds.), SITA Technology Ltd, London.

Possible options include, for example, mono- or bisacylphosphine oxides, as described, for example, in EP-A 7 508, EP-A 57 474, DE-A 196 18 720, EP-A 495 751 or EP-A 615 980, examples being 2,4,6-trimethylbenzoyldiphenylphosphine oxide (Lucirin® TPO from BASF SE), ethyl 2,4,6-trimethylbenzoylphenylphosphinate (Lucirin® TPO L from BASF SE), bis(2,4,6-trimethylbenzoyl)phenylphosphine oxide (Irgacure® 819 from BASF Ludwigshafen), benzophenones, hydroxyacetophenones, phenylglyoxylic acid and its derivatives, or mixtures of these photoinitiators. Examples include benzophenone, acetophenone, acetonaphthoquinone, methyl ethyl ketone, valerophenone, hexanophenone, α-phenylbutyrophenone, p-morpholinopropiophenone, dibenzosuberone, 4-morpholinobenzophenone, 4-morpholinodeoxybenzoin, p-diacetylbenzene, 4-aminobenzophenone, 4'-methoxyacetophenone, β-methylanthraquinone, tert-butylanthraquinone, anthraquinonecarboxylic esters, benzaldehyde, α-tetralone, 9-acetylphenanthrene, 2-acetylphenanthrene, 10-thioxanthenone, 3-acetylphenanthrene, 3-acetylindole, 9-fluorenone, 1-indanone, 1,3,4-triacetylbenzene, thioxanthen-9-one, xanthen-9-one, 2,4-dimethylthioxanthone, 2,4-diethylthioxanthone, 2,4-di-isopropylthioxanthone, 2,4-dichlorothioxanthone, benzoin, benzoin iso-butyl ether, chloroxanthenone, benzoin tetrahydropyranyl ether, benzoin methyl ether, benzoin ethyl ether, benzoin butyl ether, benzoin iso-propyl ether, 7H-benzoin methyl ether, benz[de]anthracene-7-one, 1-naphthaldehyde, 4,4'-bis(dimethylamino)benzophenone, 4-phenylbenzophenone, 4-chlorobenzophenone, Michler's ketone, 1-acetonaphthone, 2-acetonaphthone, 1-benzoylcyclohexan-1-ol, 2-hydroxy-2,2-dimethylacetophenone, 2,2-dimethoxy-2-phenylacetophenone, 2,2-diethoxy-2-phenylacetophenone, 1,1-dichloroacetophenone, 1-hydroxyacetophenone, acetophenone dimethyl ketal, o-methoxybenzophenone, triphenylphosphine, tri-o-tolylphosphine, benz[a]anthracene-7,12-dione, 2,2-diethoxyacetophenone, benzil ketals, such as benzil dimethyl ketal, 2-methyl-1-[4-(methylthio)phenyl]-2-morpholinopropan-1-one, anthraquinones such as 2-methylanthraquinone, 2-ethylanthraquinone, 2-tert-butylanthraquinone, 1-chloroanthraquinone, 2-amylanthraquinone and 2,3-butanedione.

Also suitable are nonyellowing or low-yellowing photoinitiators of the phenylglyoxalic ester type, as described in DE-A 198 26 712, DE-A 199 13 353 or WO 98/33761.

Typical mixtures comprise, for example, 2-hydroxy-2-methyl-1-phenylpropan-2-one and 1-hydroxycyclohexyl phenyl ketone, bis(2,6-di methoxybenzoyl)-2,4,4-trimethylpentylphosphine oxide and 2-hydroxy-2-methyl-1-phenylpropan-1-one, benzophenone and 1-hydroxycyclohexyl phenyl ketone, bis(2,6-dimethoxybenzoyl)-2,4,4-trimethylpentylphosphine oxide and 1-hydroxycyclohexyl phenyl ketone, 2,4,6-trimethylbenzoyldiphenylphosphine oxide and 2-hydroxy-2-methyl-1-phenylpropan-1-one, 2,4,6-trimethylbenzophenone and 4-methylbenzophenone or 2,4,6-trimethylbenzophenone, and 4-methylbenzophenone and 2,4,6-trimethylbenzoyldiphenylphosphine oxide.

Preference among these photoinitiators is given to 2,4,6-trimethylbenzoyldiphenylphosphine oxide, ethyl 2,4,6-trimethylbenzoylphenylphosphinate, bis(2,4,6-trimethylbenzoyl)phenylphosphine oxide, benzophenone, 1-benzoylcyclohexan-1-ol, 2-hydroxy-2,2-dimethylacetophenone, and 2,2-dimethoxy-2-phenylacetophenone.

The coating compositions comprise the photoinitiators preferably in an amount of 0.05 to 10% by weight, more preferably 0.1 to 8% by weight, especially 0.2 to 5% by weight, based on the total amount of components (a) to (f).

The coating compositions may comprise further customary coatings additives, such as flow control agents, defoamers, UV absorbers, dyes, pigments and/or fillers.

Suitable fillers comprise silicates, for example silicates obtainable by hydrolysis of silicon tetrachloride, such as Aerosil® R from Degussa, siliceous earth, talc, aluminum silicates, magnesium silicates, and calcium carbonates, etc. Suitable stabilizers comprise typical UV absorbers such as oxanilides, triazines and benzotriazole (the latter obtainable as Tinuvin® R products from BASF, Ludwigshafen), and benzophenones. They can be used alone or together with suitable free-radical scavengers, examples being sterically hindered amines such as 2,2,6,6-tetramethylpiperidine, 2,6-di-tert-butylpiperidine or derivatives thereof, for example bis(2,2,6,6-tetramethyl-4-piperidyl)sebacate. Stabilizers are typically used in amounts of 0.1 to 5.0% by weight, based on the "solid" components present in the preparation.

The coating compositions are especially suitable as coating agents for coating or impregnation of lignin containing substrates and plastics containing substrates, such as wood, woodbase materials, wood-containing substrates as well as cellulose fibers, such as paper, paperboard or cardboard.

Especially preferred are those woods that are typically used for parquet, for example oak, spruce, pine, beech, maple, chestnut, plane, robinia, ash, birch, stone pine and elm, but also cork.

The coating compositions are particularly suitable as a preliminary coating (primer) preferably adhesion primer for wood, especially for parquet, veneer surfaces of furniture, cork and compressed woodbase materials, such as fier boards or flake boards, particularly the ones of high or medium density.

Through application of such coating compositions, it is possible to improve the adhesion of further coatings on this primer.

The substrates are coated by customary processes known to those skilled in the art, by applying at least one coating composition to the substrate to be coated in the desired thickness and removing the volatile constituents from the coating compositions. This operation may be repeated once or optionally more than once. Application to the substrate can be effected in a known manner, for example by spraying, troweling, knifecoating, brushing, rolling, roller coating or pouring. The coating thickness is generally in a range from about 3 to 1000 g/m$^2$ and preferably 10 to 200 g/m$^2$.

Optionally, when a plurality of layers of the coating composition are applied one on top of another, each coating operation may be followed by radiation curing.

The radiation cure is accomplished by exposure to high-energy radiation, i.e. UV radiation, or daylight, preferably light in the wavelength range of 250 to 600 nm, or by exposure to high-energy electrons (electron beams; 150 to 300 keV). Examples of radiation sources used include high-pressure mercury vapor lamps, lasers, pulsed lamps (flash light), halogen lamps or excimer lamps. The radiation dose normally sufficient for crosslinking in the case of UV curing is in the range from 80 to 3000 and preferably 100 to 2000 mJ/cm$^2$.

Irradiation can optionally also be carried out in the absence of oxygen, for example under an inert gas atmosphere. Suitable inert gases are preferably nitrogen, noble gases, carbon dioxide, or combustion gases. In addition, irradiation can be effected by covering the coating composition with transparent media. Transparent media are, for example, polymeric films, glass or liquids, e.g. water. Particular preference is given to irradiation in the manner as described in DE-A1 199 57 900.

In a preferred process, curing is effected continuously, by passing the substrate treated with the coating composition at constant speed past a radiation source. For this it is necessary that the cure rate of the coating composition be sufficiently high.

This varied course of curing over time can be exploited particularly when the coating of the article is followed by another processing step in which the film surface comes into direct contact with another article or is worked on mechanically.

The advantage of the coating compositions is that the coated articles can be processed further immediately after the radiation curing because the surface is no longer tacky. On the other hand, the dry film is still sufficiently flexible and extensible that the article can still be deformed without the film flaking off or tearing.

The invention is illustrated in detail by the nonlimiting examples which follow.

EXAMPLES

Example 1

In a three-neck flask with reflux condenser and stirrer, 227.2 g of Pluriol® E 600 (component (b), polyethylene glycol having a mean hydroxyl number of 187 mg KOH/g, molar mass about 600 g/mol, commercial product from BASF SE), 94.1 g of Pluriol® A1020E (component (f1), methanol-started polyethylene glycol having a mean hydroxyl number of 50 mg KOH/g, molar mass about 1100 g/mol, commercial product from BASF SE), 24.0 g of dimethylolpropionic acid, 57.2 g of 2-hydroxyethyl acrylate, 0.65 g of 2,6-di-tert-butyl-p-cresol, 0.32 g of methylhydroquinone, 0.65 g of triphenyl phosphite and 0.33 g of diphenylethene were mixed at 60° C. As a catalyst, 0.30 g of dibutyltin dilaurate was added to the thoroughly commixed initial charge while sparging with nitrogen. 208.7 g of isophorone diisocyanate were added dropwise to this mixture at 60 to 70° C. within 60 minutes. The reaction mixture was subsequently stirred at internal temperature 75 to 80° C. for 7 hours until its NCO value was 0.89%. Then 332 g of anhydrous acetone were added, and then 17.5 g of 6-amino-4-azahexanecarboxylic acid (sodium salt) in 40% purity were added, and after a few minutes 64.5 g of a 10% by weight solution of sodium hydroxide in water were added. The reaction mixture was diluted with 260 g of water. Lastly, the acetone was distilled off at 50° C. and 100 mbar.

The solids content of the urethane acrylate was 71% by weight. The double bond density of the solvent-free urethane acrylate was 0.8 mol/kg, and the viscosity was 3.8 Pa*s.

Example 2

In a three-neck flask with reflux condenser and stirrer, 191.2 g of Pluriol® E 600 (component (b), polyethylene glycol having a mean hydroxyl number of 187 mg KOH/g, molar mass about 600 g/mol, commercial product from BASF SE), 167.7 g of Pluriol® A1020E (component (f1), molar mass about 1100 g/mol, methanol-started polyethylene glycol having a mean hydroxyl number of 50 mg KOH/g, commercial product from BASF SE), 21.4 g of dimethylolpropionic acid, 46.7 g of 2-hydroxyethyl acrylate, 0.65 g of 2,6-di-tert-butyl-p-cresol, 0.32 g of methylhydroquinone, 0.65 g of triphenyl phosphite and 0.33 g of diphenylethene were mixed at 60° C. As a catalyst, 0.30 g of dibutyltin dilaurate was added to the thoroughly commixed initial charge while sparging with nitrogen. 186.2 g of isophorone diisocyanate were added dropwise to this mixture at 60 to 70° C. within 60 minutes. The reaction mixture was subsequently stirred at internal temperature 75 to 80° C. for 7 hours until its NCO value was 0.8%. Then 250 g of anhydrous acetone were added, and then 15.6 g of 6-amino-4-azahexanecarboxylic acid (sodium salt) in 40% purity were added, and after a few minutes 57.5 g of 10% by weight solution of sodium hydroxide in water were added. The reaction mixture was diluted with 260 g of water. Lastly, the acetone was distilled off at 50° C. and 100 mbar.

The solids content of the urethane acrylate was 68% by weight. The double bond density of the solvent-free urethane acrylate was 0.7 mol/kg, and the viscosity was 2.0 Pa*s.

Comparative Example C1

In a three-neck flask with reflux condenser and stirrer, 285 g of Pluriol® E 600 (polyethylene glycol having a mean hydroxyl number of 187 mg KOH/g, molar mass about 600 g/mol, commercial product from BASF SE), 26.8 g of dimethylolpropionic acid, 63.8 g of 2-hydroxyethyl acrylate, 0.65 g of 2,6-di-tert-butyl-p-cresol, 0.32 g of methylhydroquinone, 0.65 g of triphenyl phosphite and 0.33 g of diphenylethene were mixed at 60° C. As a catalyst, 0.30 g of dibutyltin dilaurate was added to the thoroughly commixed initial charge while sparging with nitrogen. 233.1 g of isophorone diisocyanate were added dropwise to this mixture at 60 to 70° C. within 60 minutes. The reaction mixture was subsequently stirred at internal temperature 75 to 80° C. for 7 hours until its NCO value was 0.89%. Then 332 g of anhydrous acetone were added, and then 19.5 g of 6-amino-4-azahexanecarboxylic acid (sodium salt) in 40% purity were added, and after a few minutes 72 g of 10% by weight solution of sodium hydroxide in water were added. The reaction mixture was diluted with 270 g of water. Lastly, the acetone was distilled off at 50° C. and 100 mbar.

The solids content of the urethane acrylate was 67% by weight. The double bond density of the solvent-free urethane acrylate was 0.9 mol/kg, and the viscosity was 7.6 Pa*s.

Comparative Example 2

In a three-neck flask with reflux condenser and stirrer, 365 g of Pluriol® E 1000 (polyethylene glycol having a mean hydroxyl number of 112 mg KOH/g, commercial product from BASF SE), 20.6 g of dimethylolpropionic acid, 49.1 g of 2-hydroxyethyl acrylate, 0.63 g of 2,6-di-tert-butyl-p-cresol, 0.31 g of methylhydroquinone, 0.63 g of triphenyl phosphite and 0.31 g of diphenylethene were mixed at 60° C. As a catalyst, 0.31 g of dibutyltin dilaurate was added to the thoroughly commixed initial charge while sparging with nitrogen. 179.13 g of isophorone diisocyanate were added dropwise to this mixture at 60 to 70° C. within 20 minutes. The reaction mixture was subsequently stirred at internal temperature 75 to 80° C. for 6 hours until its NCO value was 0.71%. Then 332 g of anhydrous acetone were added, and then 15.0 g of 6-amino-4-azahexanecarboxylic acid (sodium salt) in 40% purity were added, and after a few minutes 55.32 g of a 10% by weight solution of sodium hydroxide in water were added. The reaction mixture was diluted with 260 g of water. Lastly, the acetone was distilled off at 50° C. and 100 mbar.

The solids content of the urethane acrylate was 69% by weight. The double bond density of the solvent-free urethane acrylate was 0.7 mol/kg, and the viscosity was 7.7 Pa*s.

Comparative Example 3

In a three-neck flask with reflux condenser and stirrer, 245.5 g of Pluriol® E 600 (polyethylene glycol having a mean hydroxyl number of 187 mg KOH/g, molar mass about 600 g/mol, commercial product from BASF SE), 50.85 g of Pluriol® A500E (methanol-started polyethylene glycol having a mean hydroxyl number of 110 mg KOH/g, molar mass about 500 g/mol, commercial product from BASF SE), 26.0 g of dimethylolpropionic acid, 61.85 g of 2-hydroxyethyl acrylate, 0.65 g of 2,6-di-tert-butyl-p-cresol, 0.32 g of methylhydroquinone, 0.65 g of triphenyl phosphite and 0.33 g of diphenylethene were mixed at 60° C. As a catalyst, 0.30 g of dibutyltin dilaurate was added to the thoroughly commixed initial charge while sparging with nitrogen. 225.8 g of isophorone diisocyanate were added dropwise to this mixture at 60 to 70° C. within 60 minutes. The reaction mixture was subsequently stirred at internal temperature 75 to 80° C. for 7 hours until its NCO value was 0.78%. Then 332 g of anhydrous acetone were added, and then 18.9 g of 6-amino-4-azahexanecarboxylic acid (sodium salt) in 40% purity were added, and after a few minutes 69.7 g of 10% by weight solution of sodium hydroxide in water were added. The reaction mixture was diluted with 260 g of water. Lastly, the acetone was distilled off at 50° C. and 100 mbar.

The solids content of the urethane acrylate was 68% by weight. The double bond density of the solvent-free urethane acrylate was 0.85 mol/kg, and the viscosity was 3.8 Pa*s.

Comparative Example 4

In a three-neck flask with reflux condenser and stirrer, 220.6 g of Pluriol® E 600 (polyethylene glycol having a mean hydroxyl number of 187 mg KOH/g, molar mass about 600 g/mol, commercial product from BASF SE), 96.8 g of Pluriol® A500E (methanol-started polyethylene glycol having a mean hydroxyl number of 110 mg KOH/g, molar mass about 500 g/mol, commercial product from BASF SE), 24.7 g of dimethylolpropionic acid, 53.9 g of 2-hydroxyethyl acrylate, 0.65 g of 2,6-di-tert-butyl-p-cresol, 0.32 g of methylhydroquinone, 0.65 g of triphenyl phosphite and 0.33 g of diphenylethene were mixed at 60° C. As a catalyst, 0.30 g of dibutyltin dilaurate was added to the thoroughly commixed initial charge while sparging with nitrogen. 214.8 g of isophorone diisocyanate were added dropwise to this mixture at 60 to 70° C. within 60 minutes. The reaction mixture was subsequently stirred at internal temperature 75 to 80° C. for 7 hours until its NCO value was 0.68%. Then 332 g of anhydrous acetone were added, and then 18.0 g of 6-amino-4-azahexanecarboxylic acid (sodium salt) in 40% purity were added, and after a few minutes 66.3 g of 10% by weight solution of sodium hydroxide in water were added. The reaction mixture was diluted with 260 g of water. Lastly, the acetone was distilled off at 50° C. and 100 mbar.

The solids content of the urethane acrylate was 73% by weight. The double bond density of the solvent-free urethane acrylate was 0.75 mol/kg, and the viscosity was 3.7 Pa*s.

Stability Tests

The urethane acrylates from the above examples were each stored in 70% by weight and 35% by weight dispersions at 60° C. and tested for stability before the occurrence of a sediment.

The following results were found:

|  | Comparative example 1 | Comparative example 2 | Comparative example 4 | Example 1 | Example 2 |
|---|---|---|---|---|---|
| 70% by wt. | >1 week | >3 weeks | >3 weeks | >3 weeks | >3 weeks |
| 35% by wt. | 2 days | 1 day | 1 day | 3 weeks | >3 weeks |

Stability on Mixing with Other Dispersions

About 30 g of aqueous dispersions of the urethane acrylates from the above examples were admixed with 2 drops each of the following commercial dispersions having different physical properties:
- alkaline dispersion (Laromer® UA9064 GD, aqueous dispersion of a urethane acrylate, about 62% strength, BASF, Ludwigshafen)
- emulsion (Joncryl® 1992, pH about 8.5, about 43% strength, BASF, Ludwigshafen)
- acidic dispersion (Luhydran® S 938 T, APEO-free, cross-linkable, OH number about 100, pH about 2.0, about 45% strength, BASF, Ludwigshafen)

The mixtures were stored at room temperature for 1 week and assessed visually.

|  | Comparative example 1 | Comparative example 2 | Example 1 |
|---|---|---|---|
| Alkaline dispersion | turbid, white sediment | turbid, gel particles | clear, gel particles |
| Emulsion | turbid, specks | clear, gel particles | clear, gel particles |
| Acidic dispersion | turbid, white sediment | white, streaks | turbid, gel particles |

Application Examples

Beech

The aqueous polyurethane formulations are applied as adhesion primer at 10 g/m² to beech parquet and partly gelated in a UV system at a belt speed of 40 m/min. Subsequently, a primer (Laromer® PE 56F (commercially available mixture of polyester acrylate and epoxy acrylate from BASF SE, Ludwigshafen): 1,6-hexanediol diacrylate; 70:30) is applied with a thin layer thickness of 25 g/m² and partly gelated under the UV system at a belt speed of 35 m/min. The second layer of the primer is cured twice under the UV system at a belt speed of 10 m/min.

Application Examples

Oak

The aqueous polyurethane formulations are applied as adhesion primer at 10 g/m² to oak parquet and partly gelated in a UV system at a belt speed of 40 m/min. Subsequently, a primer (Laromer® PE 56F (commercially available mixture of polyester acrylate and epoxy acrylate from BASF SE, Ludwigshafen): 1,6-hexanediol diacrylate; 70:30) is applied with a thin layer thickness of 25 g/m² and partly gelated under the UV system at a belt speed of 35-40 m/min. The second layer of the primer is applied and irradiated by the same process. The third layer is cured twice under the UV system at a belt speed of 10 m/min.

As a photoinitiator for the hydroprimer, Irgacure® 500 from BASF (1:1 mixture of 1-hydroxycyclohexyl phenyl ketone and benzophenone) was used, and for the primer Irgacure 184.

Coin test: A coin is run over the parquet surface under pressure at a sharp angle. If there is loss of adhesion of the UV coating, this is shown by stress whitening (a clearly discernible scratch is formed). If the wood can be deformed without loss of adhesion of the UV coating, this can be described as a very good coin test.

Coin test:

|  | Comparative example 1 | Comparative example 2 | Example 1 | Example 2 |
|---|---|---|---|---|
| Beech | OK | OK | OK | OK |
| Oak | OK | OK | OK | OK |

Hamberger plane:

The Hamberger plane serves to test the adhesion of the overall coating structure to the substrate (beech parquet). A defined metallic test specimen is pushed over the test surface (varnished parquet). For this purpose, the force acting on the test surface is increased from 0 to 50 N until there is visible damage to the parquet varnish system.

|  | Comparative example 1 | Comparative example 2 | Example 1 | Example 2 |
|---|---|---|---|---|
| Beech | 20 | 19 | 17 | 18 |
| Oak | 23 | 24 | 21 | 20 |

The test results show a comparable level within the accuracy of measurement between the coatings based on the inventive and comparative examples.

The invention claimed is:

1. A coating composition, comprising:
a urethane (meth)acrylate (A) comprising, as formation components:
   (a) at least one isocyanate having at least 2 isocyanate functions,
   (b) at least one polyalkylene oxide polyether having at least 2 hydroxyl functions,
   (c) at least one hydroxy-functional (meth)acrylate having exactly one hydroxyl function and at least one (meth)acrylate function,
   (d) at least one compound having at least one isocyanate-reactive group and at least one acid function,
   (e) optionally at least one compound having at least one isocyanate-reactive group and at least one basic group for neutralization of the acid groups of component (d),
   (f1) at least one monofunctional polyalkylene oxide polyether alcohol having a number-average molecular weight Mn of at least 600 g/mol,
   (f2) optionally at least one monoalcohol (f2) having exactly one hydroxyl function and no further functional group beyond that,
   (g) optionally at least one di- or polyamine, and
   (h) optionally at least one primary or secondary amine (h) for activation of the (meth)acrylate group.

2. The coating composition according to claim 1, wherein the isocyanate (a) is a (cyclo)aliphatic diisocyanate.

3. The coating composition according to claim 1, wherein component (b) comprises alkoxylated di- or polyols of formula (Ia) to (Id)

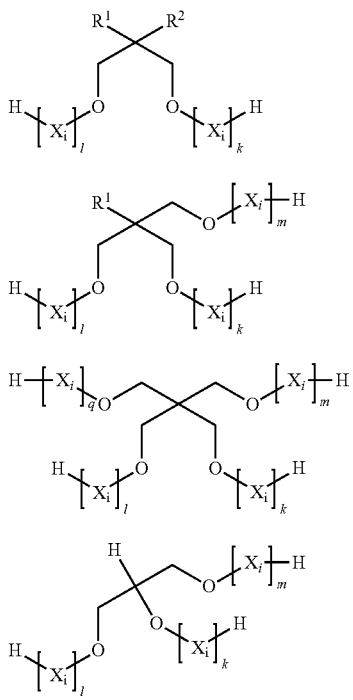

wherein
$R^1$ and $R^2$ are each independently hydrogen, or $C_1$-$C_{18}$-alkyl optionally substituted by aryl, alkyl, aryloxy, alkyloxy, heteroatoms and/or heterocycles,
k, l, m, q are each independently an integer from 1 to 15, and
each $X_i$ for i=1 to k, 1 to l, 1 to m and 1 to q is independently be selected from the group consisting, of —$CH_2$—$CH_2$—O—, —$CH_2$—$CH(CH_3)$—O—, —$CH(CH_3)$—$CH_2$—O—, —$CH_2$—$C(CH_3)_2$—O—, —$C(CH_3)_2$—$CH_2$—O—, —$CH_2$—CHVin-O—, —CHVin-$CH_2$—O—, —$CH_2$—CHPh-O— and CHPh-$CH_2$—O—, in which Ph is phenyl and Vin is vinyl.

4. The coating composition according to claim 1, wherein component (b) is a polyalkylene glycol of formula HO—[—$X_i$—]$_n$—H wherein
$X_i$ for each i=1 to n is independently be selected from the group consisting of —$CH_2$—$CH_2$—O—, —$CH_2$—$CH(CH_3)$—O—, and —$CH(CH_3)$—$CH_2$—O—, and
n may be an integer from 5 to 60.

5. The coating composition according to claim 1, wherein component (c) is selected from the group consisting of 2-hydroxyethyl (meth)acrylate, 2- or 3-hydroxypropyl (meth)acrylate, 1,4-butanediol mono(meth)acrylate, neopentyl glycol mono(meth)acrylate, 1,5-pentanediol mono (meth)acrylate, 1,6-hexanediol mono(meth)acrylate, glyceryl di(meth)acrylate, trimethylolpropane di(meth)acrylate, pentaerythrityl tri(meth)acrylate, 2-hydroxyethyl(meth) acrylate, 2-hydroxypropyl(meth)acrylate, and 3-hydroxypropyl(meth)acrylate and mixtures thereof.

6. The coating composition according to claim 1, wherein a component (d) is selected from the group consisting of mercaptoacetic acid (thioglycolic acid), mercaptopropionic acid, mercaptosuccinic acid, hydroxyacetic acid, hydroxypropionic acid (lactic acid), hydroxysuccinic acid, hydroxypivalic acid, dimethylolpropionic acid, dimethylolbutyric acid, hydroxydecanoic acid, hydroxydodecanoic acid, 12-hydroxystearic acid, hydroxyethanesulfonic acid, hydroxypropanesulfonic acid, mercaptoethanesulfonic acid, mercaptopropanesulfonic acid, aminoethanesulfonic acid, aminopropanesulfonic acid, glycine (aminoacetic acid), N-cyclohexylaminoethanesulfonic acid, N-cyclohexylaminopropanesulfonic acid, iminodiacetic acid, ammonium or alkali metal salts of 6-amino-4-azahexanecarboxylic acid (N-(2'-carboxyethyl)ethylenediamine) and 5-amino-3-azapentanesulfonic acid (N-(2'-sulfoethyl)ethylenediamine) and mixtures thereof.

7. The coating composition according to claim 1, wherein component (f1) has formula $R^3$—O—[—$Y_i$—]$_w$—H wherein
$R^3$ is independently $C_1$- to $C_4$-alkyl,
w is an integer from 12 to 50, and
each $Y_i$ for i=1 to w is independently be selected from the group consisting of —$CH_2$—$CH_2$—O—, —$CH_2$—$CH(CH_3)$—O—, —$CH(CH_3)$—$CH_2$—O—, —$CH_2$—$C(CH_3)_2$—O—, —$C(CH_3)_2$—$CH_2$—O—, —$CH_2$—CHVin-O—, —CHVin-$CH_2$—O—, —$CH_2$—CHPh-O— and CHPh-$CH_2$—O—, in which Ph is phenyl and Vin is vinyl.

8. The coating composition according to claim 1, wherein both a compound (d) selected from the group consisting of dimethylolpropionic acid and dimethylolbutyric acid and mixtures thereof, and a compound selected from the group consisting of 6-amino-4-azahexanecarboxylic acid (N-(2'-carboxyethyl)ethylenediamine) and 5-amino-3-azapentanesulfonic acid (N-(2'-sulfoethyl)ethylenediamine) and mixtures thereof, are present.

9. The coating composition according to claim 1, wherein the compound (g) is added to the reaction mixture when the NCO content thereof (calculated at 42 g/mol) is at least 0.2% by weight and not more than 1.5% by weight.

10. The coating composition according to claim 1, wherein the composition optionally further comprises at least one reactive diluent (B), and wherein the urethane (meth)acrylate (A) comprises the following:
(a) 100 mol % of isocyanate functions,
(b) 25 to 75 mol % of hydroxyl functions (based on isocyanate functions in (a)),
(c) 25 to 75 mol % of hydroxyl functions (based on isocyanate functions in (a)),
(d) 0 to 30 mol % of hydroxyl functions (based on isocyanate functions in (a)),
(e) 0 to 5 mol % of isocyanate-reactive groups (based on isocyanate functions in (a)),
(f1) 5 to 10 mol % of hydroxyl functions (based on isocyanate functions in (a)),
(f2) 0 to 5 mol % of hydroxyl functions (based on isocyanate functions in (a)),
(g) 0 to 5 mol % of amino functions (based on isocyanate functions in (a)),
(h) up to 0.4 mol, of aminic hydrogen atoms of primary or secondary amino groups per 1 mol of (meth)acrylate groups in (A) and/or (B), with the proviso that the sum total of the hydroxyl functions in components (b), (c), (d), (e) and (f) adds up to 100 mol % of hydroxyl functions (based on isocyanate functions in (a)).

11. A coating method, comprising:
coating and/or impregnating a lignin-containing substrate and/or plastics-containing substrate with the coating composition according to claim 1.

12. A coating method, comprising:
coating wood, woodbase materials, wood-containing substrates, cellulose fibers and/or paper raw materials with the coating composition according to claim 1.

13. A coating method, comprising:
performing adhesion priming of parquet, veneer surfaces of furniture, cork and/or compressed woodbase materials, by applying the coating composition according to claim 1.

14. A process for preparing the coating composition according to claim 1, comprising:

initially charging components (b), (c), (d), (f1) and, if present, (e), (f2) and/or (g) at least in part, to obtain a mixture; and
adding isocyanate (a) the mixture of initially charged components.

15. The coating composition according to claim 1, wherein (e) is present in the composition.

16. The coating composition according to claim 1, wherein (f2) is present in the composition.

17. The coating composition according to claim 1, wherein (g) is present in the composition.

18. The coating composition according to claim 1, wherein (h) is present in the composition.

19. The coating composition according to claim 1, wherein (e), (f2), (g) and (h) are present in the composition.

20. The coating composition according to claim 1, wherein the monofunctional polyalkylene oxide polyether alcohol has a number-average molecular weight Mn of at least 1000 g/mol.

* * * * *